United States Patent [19]

Pettersson et al.

[11] Patent Number: 5,260,523
[45] Date of Patent: Nov. 9, 1993

[54] ABSORPTIVE SOUND ATTENUATOR, IN PARTICULAR FOR AIR DUCTS IN PAPER MILLS

[75] Inventors: Henrik Pettersson, Mynämäki; Markku Lemetyinen; Esko Sjöstrand, both of Turku, all of Finland

[73] Assignee: Valmet Paper Machinery, Inc., Helsinki, Finland

[21] Appl. No.: 795,972

[22] Filed: Nov. 22, 1991

[30] Foreign Application Priority Data

Nov. 22, 1990 [FI] Finland .................. 905780

[51] Int. Cl.5 .............................. F01N 1/04
[52] U.S. Cl. .................. 181/224; 181/252
[58] Field of Search ........... 181/224, 243, 252, 286, 181/287, 292, 293

[56] References Cited

U.S. PATENT DOCUMENTS

| 3,949,830 | 4/1976 | Muehlbauer et al. | 181/224 |
| 4,034,826 | 7/1977 | Andrews | 181/224 |

FOREIGN PATENT DOCUMENTS

| 0337679A2 | 10/1989 | European Pat. Off. |
| 0342899A3 | 11/1989 | European Pat. Off. |
| 860080 | 7/1987 | Finland |
| 853854 | 11/1938 | France |
| 2386767 | 11/1978 | France |
| 2526860 | 11/1983 | France |
| WO87/03948 | 7/1987 | PCT Int'l Appl. |

Primary Examiner—Michael L. Gellner
Assistant Examiner—Khanh Dang
Attorney, Agent, or Firm—Cohen, Pontani, Lieberman, Pavane

[57] ABSTRACT

An absorptive sound attenuator, which is intended particularly for intake and/or exhaust air ducts in paper mills. The sound attenuator comprises a box-like duct housing (10), in whose interior there is an inner tube (19), which is provided with through perforations (19a) and which forms the air duct (20). Around the inner tube is placed sound absorbing material (21, 22). The inner tube (19) defines the air duct (20) in its interior, the sound being absorbed in the area of the air duct (20). In order to facilitate cleaning and/or replacing of the sound attenuator components and the absorption material (21,22,26) in the duct housing (10) the absorptive sound attenuator is provided with openable outer walls (13a,13b,14a,14b,13A,13B). When these walls are open, the absorption material (21,22,26) can be removed and/or replaced from outside the inner tube (19).

16 Claims, 3 Drawing Sheets

ABSORPTIVE SOUND ATTENUATOR, IN PARTICULAR FOR AIR DUCTS IN PAPER MILLS

FIELD OF THE INVENTION

The invention concerns an absorptive sound attenuator for air-conditioning ducts, in particular, for intake and/or exhaust air ducts in paper mills. In such an application, the sound attenuator comprises a box, inside of which is an inner tube which forms the air duct, which is provided with through perforations or the equivalent. Around the inner tube is placed sound absorbing material so that the inner tube defines the air duct in its interior and sounds are absorbed in the area of the air duct.

BACKGROUND OF THE INVENTION

Strict requirements must be met for suppression of machine produced noise in the enviroment. One important source of noise consists of the intake and exhaust air pipes for ventilation in connection with various industrial plants and other large buildings. This is especially true for blower noise, which is dispersed into the environment through the air ducts. Blowers are usually chosen or selected on the basis of the quantity of air produced by them, and attention is frequently not paid to the noise produced by them. Further, the installation and ducting has a large impact on the quality and quantity of noise emitted with the environment. The noise range produced by the blowers has quite a wide spectrum, which also imposes particular requirements on the noise suppression, in that it must be able to reduce the intensities of acoustic vibrations across this broad range.

Paper mills are particularly demanding with respect to suppression of noise, because the ventilation of the paper machine hall, and in particular the elimination of moisture from the drying section of the paper machine, require large quantities of air. It is a particular problem in the air-conditioning of a paper machine, particularly with respect to exhaust of air from the wire part. In that case, the exhaust air contains a large amount of moisture and also fibers and various paper fillers, such as kaolin clay. Such solid materials tend to block the perforated plates in an absorptive sound attenuator, and the condensing moisture wets the absorption materials and deteriorates their sound absorption properties.

The prior-art sound attenuators in general, and the sound attenuators used in paper machine ventilation in particular, have been difficult to maintain, because their absorption material is frequently subject to high moisture conditions and is susceptible to becoming wet, and the absorption material is difficult to cleanse and to replace. Consequently, absorptive sound attenuators which have been designed and dimensioned to initially operate efficiently, over time tend to operate unsatisfactorily because they are "blocked" as a result of water and/or impurity accumulation.

Since the noise produced by blowers has a wide acoustic spectrum, it is frequently necessary to use both absorptive and reactive sound attenuators in the intake and exhaust air ducts connected to the blowers. Absorptive sound attenuators operate primarily at higher frequencies; the maximum of their attenuation is at a frequency of about 1000 Hz, whereas reactive sound attenuators, which are mainly based on various resonator constructions, operate most efficiently at low frequencies, and their maximum attenuation is, as a rule, tuned in a range of about 100 to 200 Hz.

One important property of sound attenuators connected to the input or output ducts of blowers, besides the attenuation of noise, is the pressure drop or flow impedance inherent in their design.

OBJECTS OF THE INVENTION

It is an object of the present invention to provide novel solutions for the problems discussed above.

It is another object of the invention to provide such an absorptive sound attenuator, in particular, suitable for air-conditioning of paper machines, that can be serviced and cleansed quickly and easily, and in which, when necessary, the absorption material can be replaced, but whose construction is, nevertheless, relatively simple.

It is a further object of the invention to provide an easily serviceable absorptive sound attenuator that operates under demanding conditions, such as in wet, contaminated, hot, and/or dry environments.

A further object of the invention is to provide a sound attenuator that is also capable of operation when the absorption material is wet.

SUMMARY OF THE INVENTION

In view of achieving the objects of the present invention stated above and those that will become apparent later, the invention relates to an apparatus and method which facilitates cleaning the sound attenuator as a whole and the absorption material contained therein. Such facilitation of the replacement of the absorption material is achieved by providing the sound attenuator with a box which has openable outer walls, through which the absorption material can be removed and replaced from outside the inner tube.

A preferred embodiment of the invention comprises a box-like duct housing shaped as a rectangular prism, through which a perforated inner tube passes. The space between the duct housing and the inner tube is filled with pieces of absorption material. The planar side walls of the duct housing, which are parallel to the air flow, are arranged as doors, through which the pieces of absorption material as well as absorption plates or membranes, if present, that may be provided in the air duct of the inner tube, can be replaced from outside the duct housing. The absorption material can be washed and replaced after it has been removed from the interior of the duct housing. In some cases, the absorption material and the various perforated plates can also be washed when they are in their operating positions.

The perforated wall plates of the perforated plate in the inner tube in the sound attenuator and of the optionally present absorption plates, if any, protect the absorption material placed inside the plates. The perforations of the wall plates are susceptible to being blocked, in particular, in sound attenuators at paper mills, because of the fibers and fillers. By means of the present invention, it is relatively easy to cleanse the perforations so that the attenuation capacity of the sound attenuator remains adequate over an extended period of time.

BRIEF DESCRIPTION OF THE DRAWINGS

The invention will be described in detail with reference to the figures in the accompanying drawings, in which.

DETAILED DESCRIPTION OF THE PRESENTLY PREFERRED EMBODIMENTS

Figure 1:
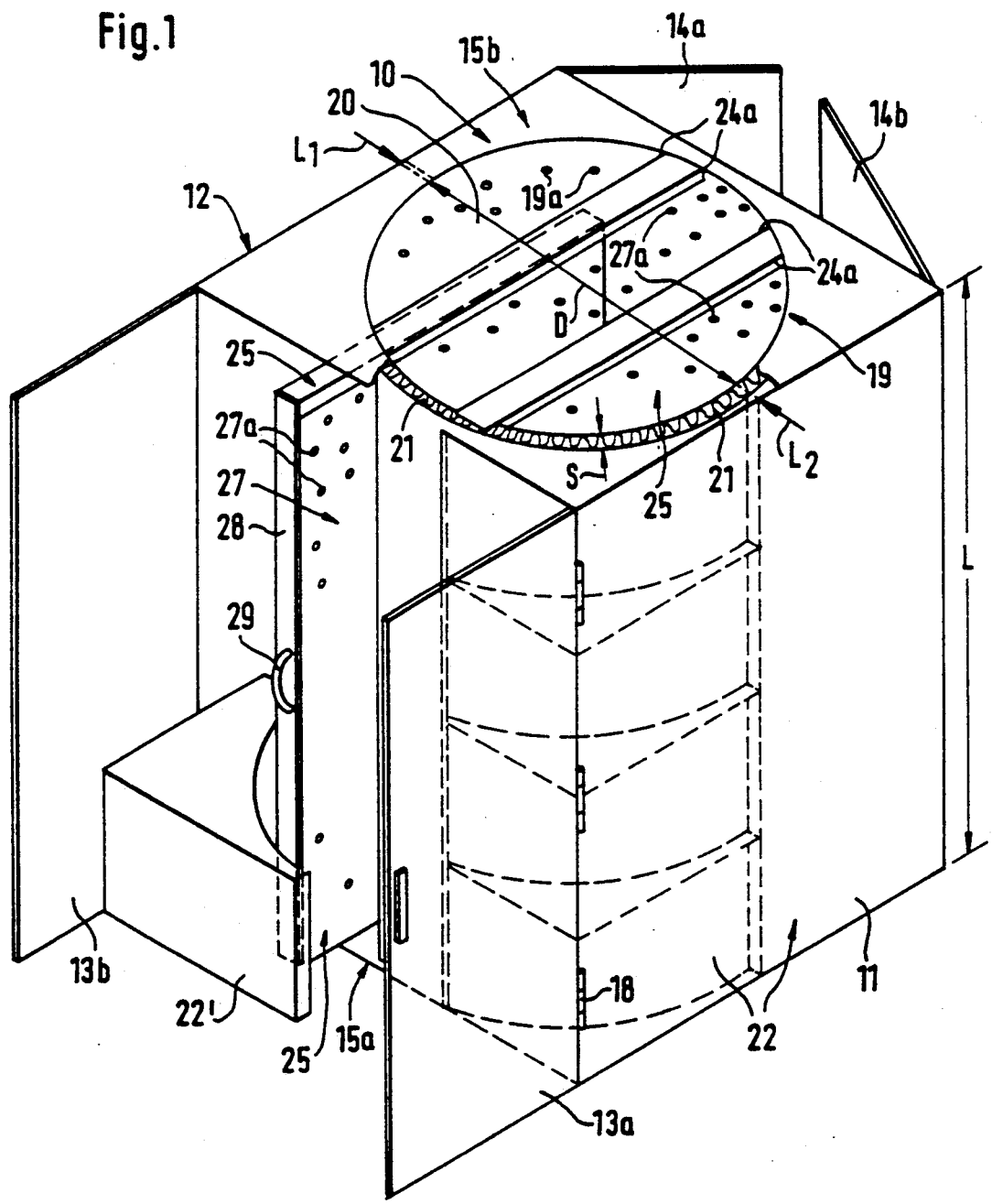
FIG. 1 is a schematic and axonometric view of a sound attenuator in accordance with the present invention, including the gated apertures.

With reference to FIG. 1, the main principles of the construction and the operation of the absorptive sound attenuator in accordance with the present invention will be described.

According to FIG. 1, the absorptive sound attenuator comprises a box-like duct housing 10 shaped as a rectangular prism, to whose frame construction, opposite, stationary vertical walls 11 and 12 have been fixed. The other vertical walls consist of openable pairs of doors 13a, 13b and 14a, 14b provided with hinges 18. Through the duct housing, an inner tube 19 of circular section passes, defining an air duct 20, whose wall plate is provided with through perforations 19a. The inner tube 19 is fixed to the duct housing by the means of its end walls 15a, 15b.

Figure 2:
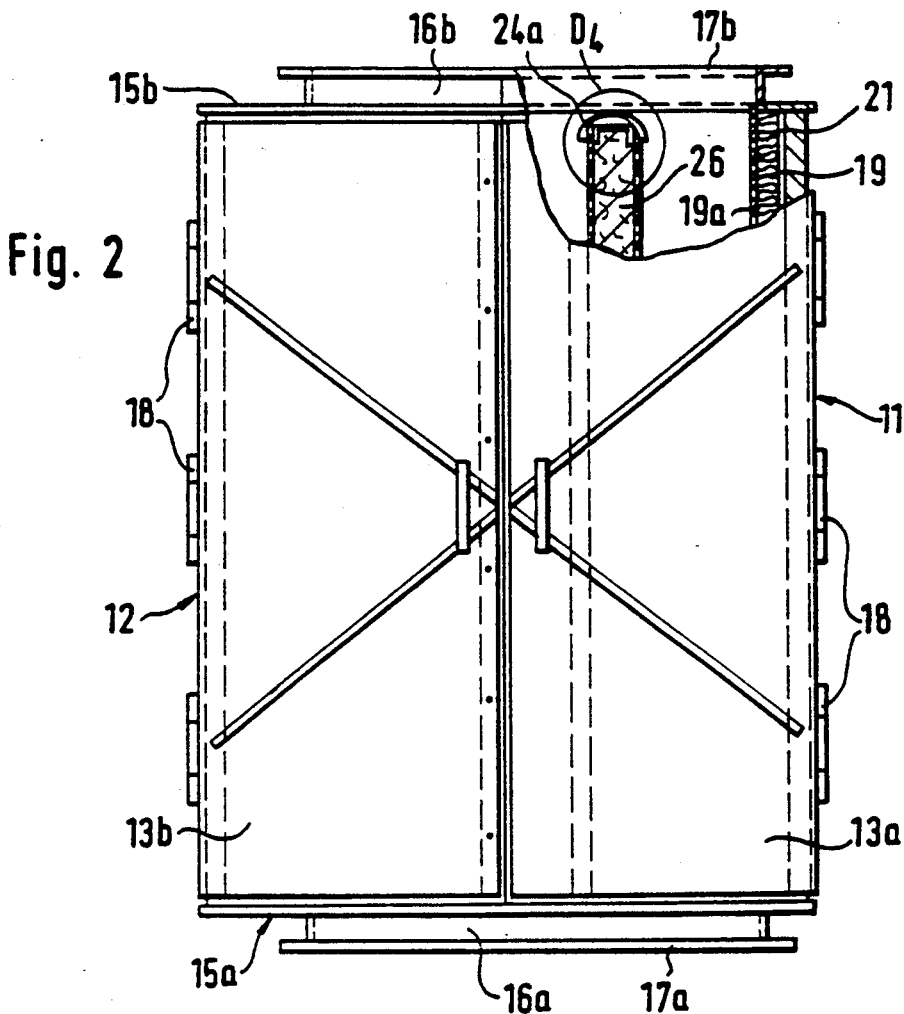
FIG. 2 is a more detailed side view, partly in section, of an embodiment of the sound attenuator in accordance with the present invention.
Figure 3:
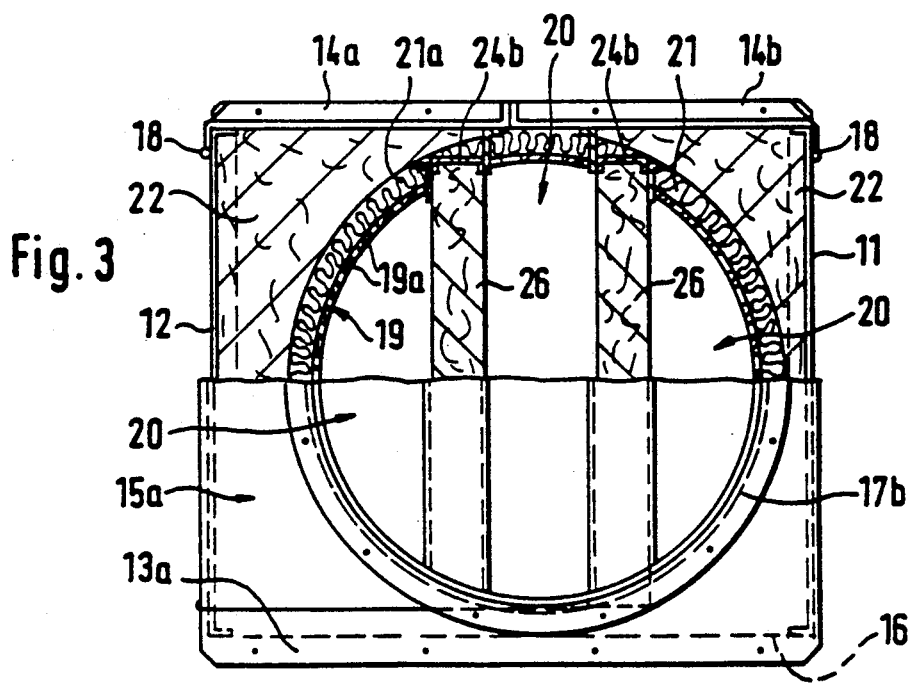
FIG. 3 shows, from a different direction (axial direction of the flow duct), the same embodiment of the sound attenuator of the present invention as FIG. 2.
Figure 4:
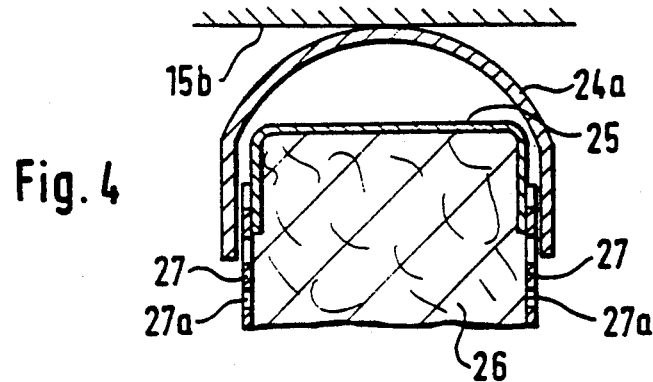
FIG. 4 shows a detail D4 from FIG. 2.

According to FIGS. 2 and 3, the end walls 15a, 15b are provided with pipe connectors 16a, 16b, which are provided with flanges 17a, 17b, by whose means the sound attenuator is fixed to the inlet or outlet air pipe (not shown) of the air system so that the inner tube 19 communicates with the air pipes without discontinuity.

In FIGS. 1 to 3, outside the inner tube 19, provided with perforations 19a, and within the duct housing 10, a ring 21 of absorption material is fitted, which is made, e.g., of mineral wool having a fixed or permanent shape. The absorption ring 21 may be composed of strips which can be attached to holders or housings. The thickness S of the ring 21 is about 50 mm.

According to FIGS. 1 to 3, the inner tube 19 in the sound attenuator is provided with two absorption plates 25, which are defined by two opposite plane wall plates 27 provided with through perforations 27a. The inner space between the plates 27 is filled with an absorbing material layer 26, which may be, for example, mineral wool or foam plastic. The absorption plates 25 can be detached from the duct housing 10 structure preferably along the axis directed outward from FIG. 1, for which purpose the absorption plates 25 are mounted by their top and bottom edges in horizontal rails 24a, and by one of their vertical edges in vertical rails 24b. One end 28 of the absorption plates 25 is provided with a handle 29, by whose means the absorption plates 25 can be pulled out for cleaning, maintenance or replacement.

The space in the duct housing 10 outside the absorption ring 21 is filled with absorption pieces 22, which are arranged and dimensioned in such a way that they can be removed for cleaning and/or replacement through the opposite pairs of doors 13a, 13b and 14a, 14b in the box. According to FIG. 1, absorption pieces 22 are placed in four vertical stacks, with four absorption pieces in each stack, one on top of the other. The round inner sides of the absorption pieces 22 are placed in tight contact with the outer face of the absorption ring 21. The other sides of the absorption pieces 22 are planar. It should be realized that if the absorption ring 21 or the duct housing 10 were formed with different shapes, the absorption pieces 22 would be conformed to fit the available space, within the scope of the present invention.

In FIG. 1, one of the absorption pieces 22' is shown as partly removed from the box-like duct housing 10. After the pieces 22 have been removed, the absorption plate 25 can also be pulled out of the duct housing 10 if necessary, as is shown in FIG. 1. The absorption plates 25 can be removed in one direction only, i.e. towards their handle 29. After the absorption pieces 22 have been removed from the duct housing 10 and the absorption plates 25 have been detached from their horizontal guides and removed out of the duct housing 10, the absorption ring 21 can also be removed if necessary. When all various absorption parts are removed, they can be cleaned, e.g., by means of water jets. Removal of these parts also allows cleaning of the holes 27a in the walls, and the holes 19a in the inner tube 19 in the sound attenuator by means of water jets or the like. After cleaning, the components of the sound attenuator can be reassembled into the duct housing 10 in the reversed sequence of their removal, while replacing any defective parts when necessary.

In some cases, it is also possible to cleanse a sound attenuator without removing the absorption pieces from the duct housing 10. In such a case, the perforations 19a and 27a, 27b are cleansed from inside the air duct 19.

The absorption piece 22 is most appropriately made of a material, preferably foam plastic, that does not become permanently wet, because water flows away from it. A suitable foam plastic is one which is not compressed, does not become wet, and has favorable sound attenuation properties. Such foam plastic, if not inherently hydrophobic, may be treated with a hydrophibizing agent.

The axial length L of the box-like duct housing, i.e. the height in vertical installation, is usually about 1500 to about 3000 mm for ventilation pipes in paper mills. The diameter D of the inner tube 19 is, as a rule, in the range of about 500 to about 2000 mm. The diameters of the holes 19a and 27a are, as a rule, in the range of about 5 to about 10 mm, preferably about 8 mm. The sound attenuator is preferably of the vertical design shown in FIGS. 1 and 2, but horizontal or diagonal designs are also possible.

Figure 5:
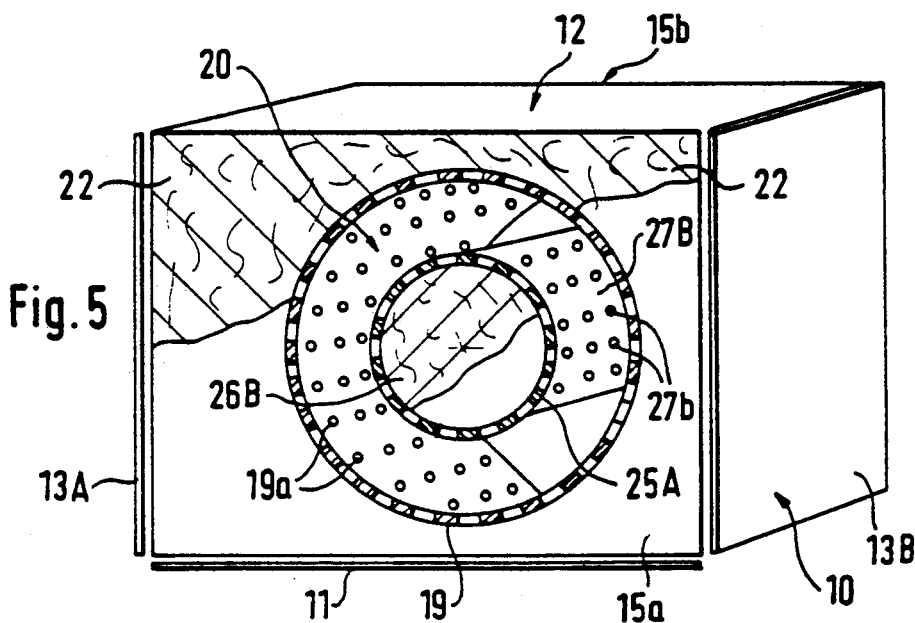
FIG. 5 is a schematic and axonometric view of a second embodiment of the present invention.
Figure 6:
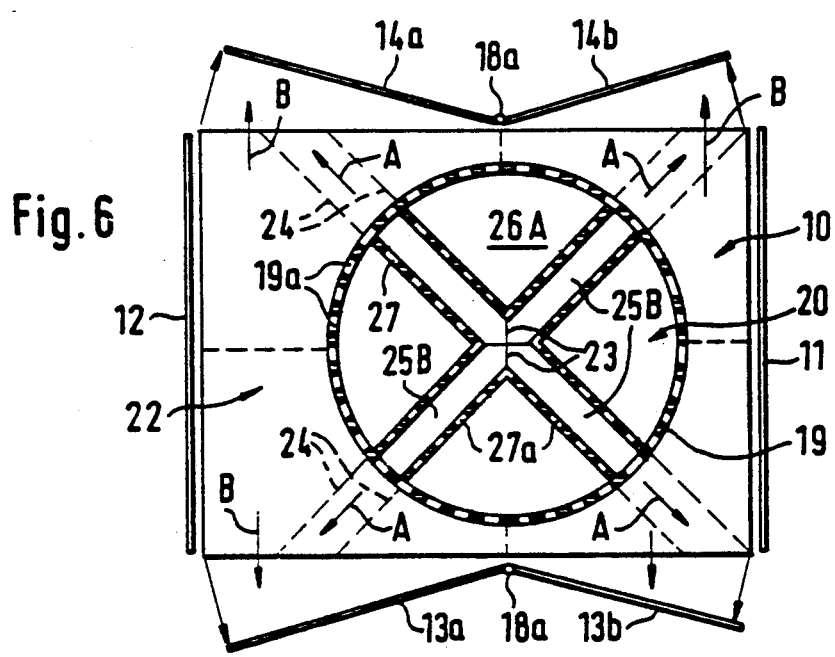
FIG. 6 is an axial view of a third embodiment of the present invention.

FIG. 5 shows a second embodiment of the present invention, in which, instead of the sound attenuation plates 25, there is a cylindrical central absorption core 25A, which is coaxial with the inner tube 19 having perforations 19a fitted in the duct housing 10. Between the inner tube 19 and the mantle tube 27B having perforations 27b of the core 25A, an air duct 20 shaped as a cylindrical ring remains. Inside the core 25A, there is a piece 26B of absorption material, which may be, for example, mineral wool or foam plastic. The core 25A is fixed to the box 10 and/or to the inner tube 19 by means arms or supports (not shown). The duct housing 10 of the sound attenuator as shown in FIG. 5 is provided with two fixed opposite walls 11 and 12 as well as with ends 15a and 15b and walls 13A and 13B, which are provided with openable hinged doors, as is shown in FIG. 6, which doors can be opened so that the opposite absorption pieces 22 can be removed. The core 25A can be removed in the direction of its longitudinal axis.

FIG. 6 shows another embodiment of the present invention in which, inside the inner tube 19, there are absorption plates 25B having an X-shape. These absorption plates 25B are interconnected at the center line of the duct 20 by their chamfered outer ends 23. Each of the absorption plates 28B is provided with an inner part 26A of absorption material and with wall plates 27 having through performations 27a. The absorption plates 25B can be removed in the direction of the arrows A in their guides 24. Because this direction A of removal is directed radially outward from the inner tube 19, the pairs of doors 13a, 13b and 14a, 14b are provided with hinges 18a at a medial portion of the box-like duct housing 10. The absorption pieces 22 can be removed in the direction of the arrows B after the pairs of doors 13a, 13b and 14a, 14b have been opened completely.

A sound attenuator in accordance with the invention can also be constructed without absorption plates 25, 25A, 25B fitted in the inner tube 19. In some applications, in particular when sound attenuation is desired at relatively low frequencies, membrane plates can substitute for the absorption plates 25, 25A, 25B that are capable of oscillating and thus damping the vibrations.

The dimensioning of a sound attenuator in accordance with the invention, of course, depends on the quantity of air that passes through its duct 20 and on the level and frequency spectrum of the noise to be attenuated. FIGS. 1 and 2 show a somewhat asymmetric construction ($L_1 > L_2$), by whose means the sound attenuation is intensified and the effective frequency range of the attenuator is widened.

It should be understood that the preferred embodiments and examples described herein are for illustrative purposes only and are not to be construed to limit the scope of the invention, which is properly delineated only in the appended claims.

What is claimed is:

1. An absorptive sound attenuator for use in connection with air ducts, in particular for intake and/or exhaust air ducts of paper mills, comprising:

an enclosure having an outer wall and an aperture formed thereto;

a conduit forming an air duct for transmitting an air flow, having a perforated wall, located inside said enclosure, said perforated wall allowing acoustic vibrations from the conduit to be transmitted therethrough;

removable sound absorbing material for absorbing acoustic vibrations in the area around said conduit which are transmitted through the perforated wall, located inside said enclosure and around said conduit;

means for opening and closing said aperture for selectively inserting and removing said sound absorbing material, through said aperture, from outside of said conduit;

said enclosure having a longitudinal axis, a rectangular cross section in a plane perpendicular to the longitudinal axis, defining four outer walls, said means for opening and closing comprising at least two openable planar outer walls of said enclosure disposed parallel to said longitudinal axis, so that air flows generally parallel to said longitudinal axis of the enclosure;

said conduit having a circular cross section shape in a plane perpendicular to the longitudinal axis, so that air flows generally parallel to said longitudinal axis of the enclosure; and said sound absorbing material in said enclosure comprising at least four pieces of absorption material, which have a cylindrical inner face and planar outer faces, said cylindrical inner face facing said perforated duct and each of said planar faces facing one of said walls of said enclosure.

2. The sound attenuator according to claim 1, wherein:

said enclosure comprises a longitudinal axis which is aligned generally vertically and said means for opening and closing comprises at least two vertically hinged openable planar side walls of said enclosure arranged so that by opening both of the side walls, an aperture larger than each of said walls results, through which said sound absorbing material can be removed and inserted into said enclosure; and said conduit is disposed in a plane parallel to the longitudinal axis, so that air flows generally parallel to said longitudinal axis of the enclosure.

3. The sound attenuator according to claim 1, wherein said perforated conduit has a circular cross section, concentric with which and inside said enclosure being disposed a ring of absorption material comprising a material which absorbs acoustic vibrations and which does not permanently absorb water, and around said absorption ring and inside said enclosure are located pieces of absorption material, which can be removed through said aperture of said enclosure when said means for opening and closing is open.

4. The sound attenuator according to claim 3, wherein said sound absorbing material comprises non-wettable and non-compressible foam plastic.

5. The sound attenuator according to claim 1, wherein said sound absorbing material comprises non-wettable and non-compressible foam plastic.

6. The sound attenuator according to claim 1 wherein said perforations of said perforated wall of said conduit are between about 5 and about 10 mm in diameter.

7. The sound attenuator according to claim 1 wherein said perforations of said perforated wall of said conduit are about 8 mm in diameter.

8. The sound attenuator according to claim 1, wherein said enclosure has a length of between about 1500 and about 3000 mm along said longitudinal axis, and said conduit has a diameter of about 500 to about 2000 mm.

9. A sound attenuator for use in connection with air ducts, in particular for intake and/or exhaust air ducts of paper mills, comprising an enclosure having an outer wall and an aperture formed thereto; a conduit forming an air duct for transmitting an air flow, having a perforated wall, located inside said enclosure, said perforated wall allowing acoustic vibrations from the conduit to be transmitted therethrough; removable sound absorbing material for absorbing acoustic vibrations in the area around said conduit which are transmitted through the perforated wall, located inside said enclosure and around said conduit; and means for opening and closing said aperture for selectively inserting and removing said sound absorbing material, through said aperture, from outside of said conduit, wherein said enclosure further comprises a longitudinal axis, said conduit is disposed in a plane parallel to the longitudinal axis, so that air flows generally parallel to said longitudinal axis of the enclosure, further comprising guides and at least one plate of absorption material disposed inside said conduit, said plate comprising layers of absorption material sandwiched between two perforated plate walls, said walls lying in a plane generally parallel to said longitudinal axis and wherein said absorption plate is generally planar and slidably arranged in the guides, so that said absorption plate can be removed for cleaning or replacement and inserted through said aperture of said enclosure.

10. The sound attenuator according to claim 9, wherein said absorption material comprises a material selected from the group consisting of mineral wool and foam plastic.

11. The sound attenuator according to claim 1, further comprising an absorption core inside said perforated conduit having a perforated outer wall, which is coaxial with said conduit, and a sound-absorptive material located inside said absorption core.

12. The sound attenuator according to claim 11, wherein said sound-absorptive material located inside said absorption core is a material selected from the group consisting of mineral wool and foam plastic.

13. A sound attenuator for use in connection with air ducts, in particular for intake and/or exhaust air ducts of paper mills, comprising an enclosure having an outer wall and an aperture formed thereto; a conduit forming an air duct for transmitting an air flow, having a perforated wall, located inside said enclosure, said perforated wall allowing acoustic vibrations from the conduit to be transmitted therethrough; removable sound absorbing material for absorbing acoustic vibrations in the area around said conduit which are transmitted through the perforated wall, located inside said enclosure and around said conduit; and means for opening and closing said aperture for selectively inserting and removing said sound absorbing material, through said aperture, from outside of said conduit, wherein said enclosure further comprises a longitudinal axis, said conduit is disposed in a plane parallel to the longitudinal axis, so that air flows generally parallel to said longitudinal axis of the enclosure, further comprising at least one membrane plate which is capable of oscillating in response to ambient acoustical vibrations, disposed inside said conduit and lying in a plane generally parallel to said longitudinal axis, so that the acoustical vibrations are decreased in amplitude, and wherein said membrane plate is generally planar and slidably arranged in guides, so that said membrane plate can be removed for cleaning or replacement and inserted through said aperture of said enclosure.

14. The sound attenuator according to claim 1, wherein said enclosure comprises:
 a substantially rectangular prismatic shape;
 two pairs of opposed outer walls having equal lengths in a direction parallel to said longitudinal axis and having substantially equal widths, said means for opening and closing comprising at least one pair of said outer walls, being openable; and
 planar ends, comprising a smooth transition from the conduit to flanged couplings, for attaching said sound attenuator to air ducts, said conduit of said sound attenuator being substantially without a step-like change in cross section along said longitudinal axis, so that if the air duct has the same circular cross section as said conduit, the outer wall of the air flow path continues from the air duct through said sound attenuator without a substantial cross section discontinuity.

15. The sound attenuator according to claim 1, further comprising a protective ring of absorption material surrounding said perforated wall of said conduit.

16. The sound attenuator according to claim 1, the enclosure having a longitudinal axis, wherein the longitudinal axis of said enclosure and the longitudinal axis of said conduit are offset from each other.

* * * * *